(12) United States Patent
Langensiepen et al.

(10) Patent No.: US 9,738,191 B2
(45) Date of Patent: Aug. 22, 2017

(54) VENTILATED AND HEATED VEHICLE SEAT ASSEMBLY

(71) Applicant: Kongsberg Automotive, Inc., Novi, MI (US)

(72) Inventors: Eric Langensiepen, Beverly Hills, MI (US); Ian Fletcher, White Lake, MI (US); Daniel Josefsson, Falköping (SE)

(73) Assignee: KONGSBERG AUTOMOTIVE, INC., Novi, MI (US)

( * ) Notice: Subject to any disclaimer, the term of this patent is extended or adjusted under 35 U.S.C. 154(b) by 171 days.

(21) Appl. No.: 14/435,062

(22) PCT Filed: Oct. 11, 2012

(86) PCT No.: PCT/US2012/059723
§ 371 (c)(1),
(2) Date: Apr. 10, 2015

(87) PCT Pub. No.: WO2014/058429
PCT Pub. Date: Apr. 17, 2014

(65) Prior Publication Data
US 2015/0274049 A1    Oct. 1, 2015

(51) Int. Cl.
*B60N 2/56* (2006.01)

(52) U.S. Cl.
CPC ............ *B60N 2/5678* (2013.01); *B60N 2/56* (2013.01); *B60N 2/565* (2013.01); *B60N 2/5621* (2013.01);
(Continued)

(58) Field of Classification Search
CPC .... B60N 2/5642; B60N 2/565; B60N 2/5678; B60N 2/56; B60N 2/5621; B60N 2/5628;
(Continued)

(56) References Cited

U.S. PATENT DOCUMENTS 6,481,801 B1 * 11/2002 Schmale .............. B60N 2/5635
297/180.12
7,114,771 B2    10/2006 Lofy et al.
(Continued)

FOREIGN PATENT DOCUMENTS

DE    10 2005 035116 B3    7/2006
DE    10 2009 024332 A1    12/2010
(Continued)

OTHER PUBLICATIONS

English language abstract and machine-assisted English language translation for Application No. De 10 2005 035116 extracted from espacenet.com database on Aug. 20, 2015, 11 pages.
(Continued)

*Primary Examiner* — Milton Nelson, Jr.
(74) *Attorney, Agent, or Firm* — Howard & Howard Attorneys PLLC (57) ABSTRACT

A vehicle seat assembly in which an impervious insert (41, 141) including a heating element and having a plurality of channels (42, 142) extending from an aperture (44, 144) positioned on a first side of at least one of a seat cushion (22) and a seat back (124) and in which a ventilation system (60) is coupled to a second side of the at least one of the seat cushion and the seat back for drawing air along the plurality of channels through the aperture and through a hole (30, 130) in the seat cushion or seat back for controlling the temperature of the seat assembly.

20 Claims, 7 Drawing Sheets

(52) U.S. Cl.
CPC ......... *B60N 2/5628* (2013.01); *B60N 2/5635* (2013.01); *B60N 2/5642* (2013.01); *B60N 2/5657* (2013.01); *B60N 2/5685* (2013.01)

(58) Field of Classification Search
CPC ... B60N 2/5635; B60N 2/5685; B60N 2/5657
USPC ............... 297/180.1, 180.12, 180.13, 180.14
See application file for complete search history.

(56) References Cited

U.S. PATENT DOCUMENTS

| | | | |
|---|---|---|---|
| 7,607,739 | B2 | 10/2009 | Browne et al. |
| 7,827,805 | B2 | 11/2010 | Comiskey et al. |
| 7,857,395 | B2 * | 12/2010 | Kikuchi ............. B60R 11/0264 297/180.14 |
| 8,662,579 | B2 * | 3/2014 | Yoshizawa ........... B60N 2/5642 297/180.13 |
| 2002/0096915 | A1 * | 7/2002 | Haupt ................ B60H 1/00285 297/180.13 |
| 2006/0130490 | A1 * | 6/2006 | Petrovski ................ A47C 7/74 62/3.3 |
| 2006/0214480 | A1 | 9/2006 | Terech |
| 2007/0040421 | A1 * | 2/2007 | Zuzga .................. B60N 2/5657 297/180.13 |
| 2011/0048033 | A1 | 3/2011 | Comiskey et al. |
| 2011/0221242 | A1 | 9/2011 | Turic |

FOREIGN PATENT DOCUMENTS

| | | | | |
|---|---|---|---|---|
| DE | EP 2423040 A2 * | 2/2012 | .......... | B60N 2/5635 |
| WO | WO 03 101777 A1 | 12/2003 | | |
| WO | WO 2009 056112 A1 | 5/2009 | | |
| WO | WO 2014 058429 A1 | 4/2014 | | |

OTHER PUBLICATIONS

English language abstract and machine-assisted English language translation for Application No. De 10 2009 024332 extracted from espacenet.com database on Aug. 20, 2015, 10 pages.
International Search Report for Application No. PCT/US2012/059723 dated Aug. 2, 2013, 2 pages.
English language abstract for WO 2009/056112 extracted from espacenet.com database on Aug. 20, 2015, 1 page.

* cited by examiner

VENTILATED AND HEATED VEHICLE SEAT ASSEMBLY

BACKGROUND OF THE INVENTION

1. Field of the Invention

The present invention generally relates to a vehicle seat assembly. In particular, the invention finds application in connection with ventilation and/or the heating of seats intended for people travelling in a vehicle.

2. Description of the Related Art

For reasons of comfort and safety, ventilation and temperature-control of seats is utilized in vehicles. Both the driver's seat and the other vehicle seats can be adapted for cooling ventilation by blowing air in or drawing air out by means of a fan. In the case of air being blown in, this supplied air is guided through the seat and out towards the person sitting in the seat. In the case of air being sucked out, this drawn-out air is guided in through the seat from the person sitting in the seat.

In addition, heated temperature-control of the seat can be accomplished through the use of a separate heating element, which generally includes electrically conductive elements, such as electrically controlled resistive wires, which are arranged in a suitable configuration within the seat cushion or seat back or both. The wires are suitably attached to a supporting material, for example foamed polyurethane. The heating element is typically connected to a power supply unit which delivers power to the heating element such that it can be heated to a suitable temperature.

SUMMARY OF THE INVENTION AND ADVANTAGES

A vehicle seat assembly comprises a seat cushion having a first side and a second side, a seat back coupled to the seat cushion with the seat back having a first side and a second side. At least one of the seat cushion and the seat back defines a hole extending from a respective first side to a second side a further defines a plurality of recesses extending from the hole along the first side. An impervious insert comprising a heating element is positioned on the first side of the seat cushion and the seat back with the insert defining an aperture aligning with the hole and a plurality of channels complementary in configuration with the recesses and aligning with the recesses. The seat assembly also includes a ventilation system coupled to the second side of the seat cushion and/or the seat back about the hole for drawing air along the plurality of channels through the aperture and the hole to the second side.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE INVENTION

The area of application of the invention is preferably in connection with a seat, and in particular with a vehicle seat 20, which, in accordance with FIGS. 1-8, includes a seat cushion 22 and a seat back 124. The vehicle seat 20 also includes a heating and cooling system that will be described in further detail below.

As best shown in FIGS. 1-4, the seat cushion 22 includes a first side 26 and a second side 28. Similarly, the seat back 124 includes a first side 126 and a second side 128. Thus, when an occupant sits in the vehicle seat 20, the occupant's back contacts the first side 126 of the seat back 124, while the occupant's buttocks and legs contact the first side 26 of the seat cushion 22. The seat cushion 22 and seat back 124 can be formed from conventional seat cushion foam, such as closed- or open-celled foam, or other type of material with suitable characteristics for providing support to an occupant.

Figure 2:
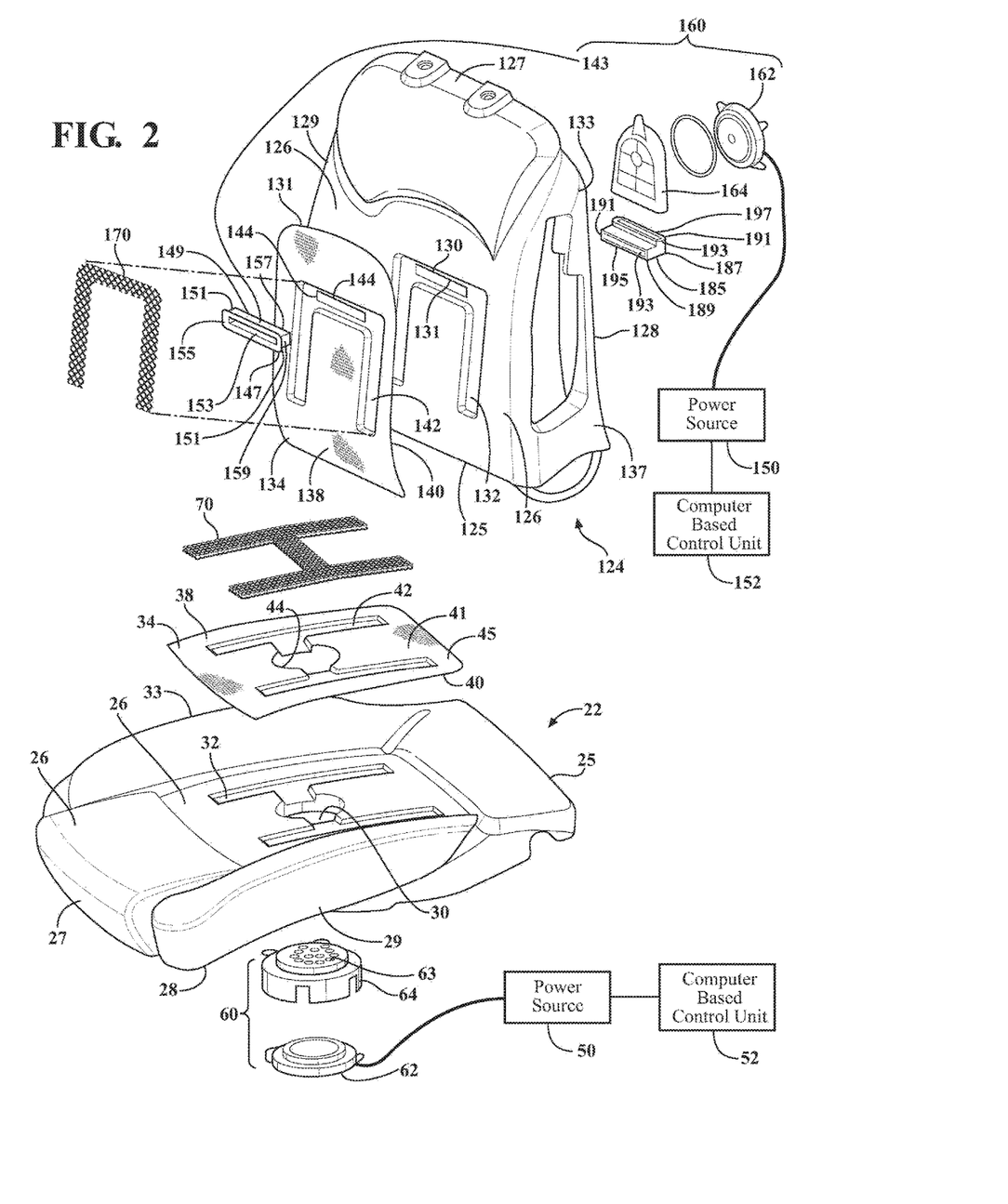
FIG. 2 is an exploded view of the vehicle seat of FIG. 1.
Figure 3:
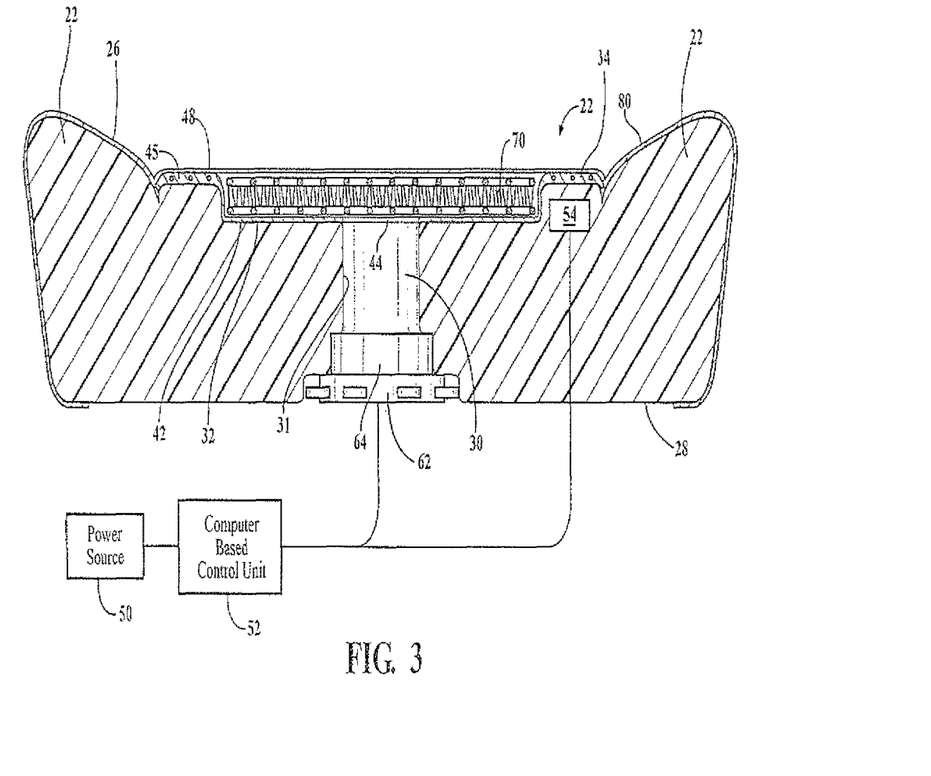
FIG. 3 is a section view of a portion of the vehicle seat of FIG. 1 taken along line 3-3.
Figure 4:
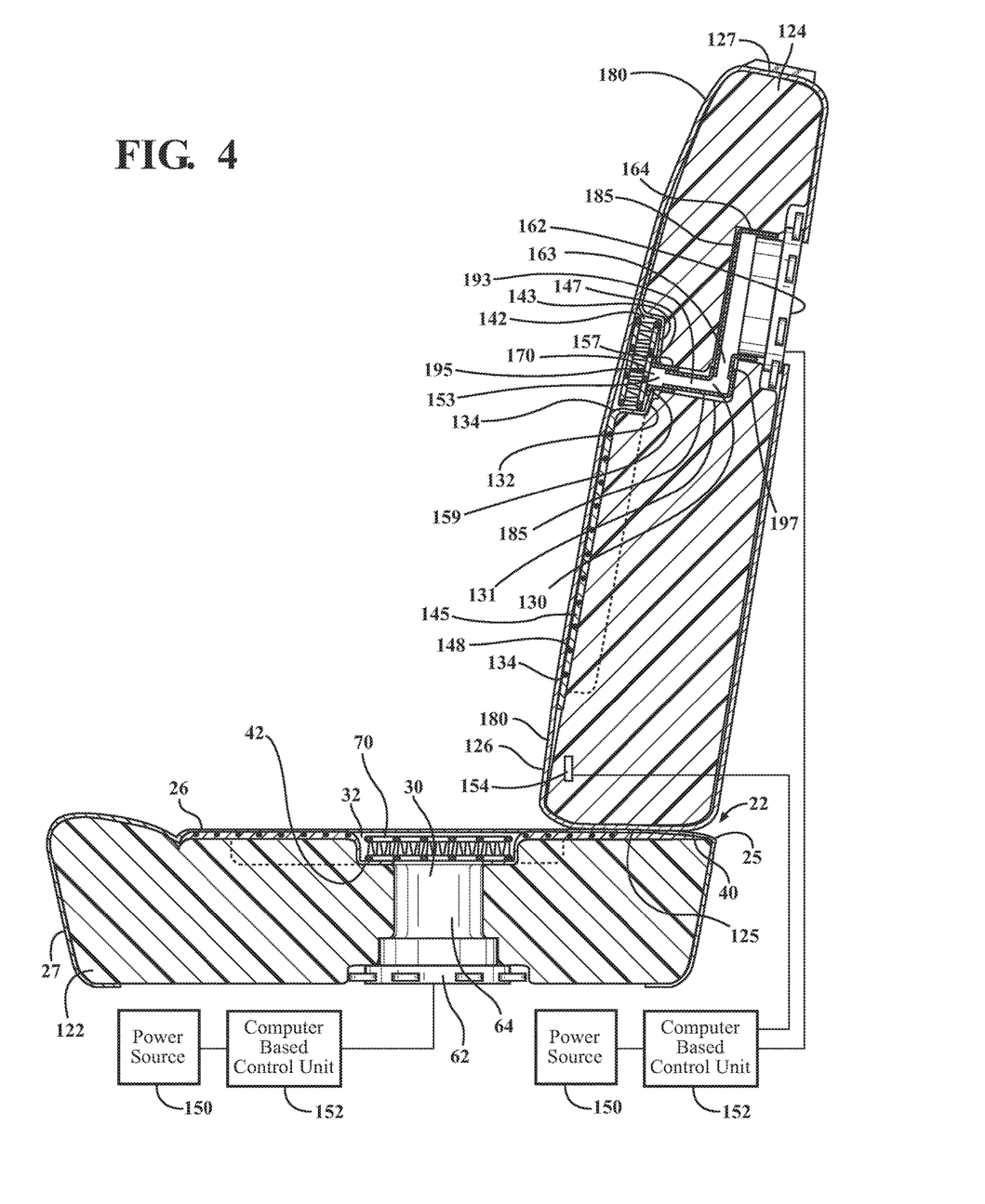
FIG. 4 is a section view of the vehicle seat of FIG. 1 taken along line 4-4.

Referring now to FIGS. 2-4, the seat cushion 22 also includes a hole 30 that extends from the first side 26 to the second side 28. A plurality of recesses 32 extend from the hole 30 along the first side 26. While the plurality of recesses 32 shown herein are in an H-shaped configuration, additional recesses 32 and alternative configurations of the plurality of recesses 32 may be utilized and is thus not limited to the general configuration illustrated. Further, while the hole 30 is shown as cylindrical in shape extending from the first side 26 to the second side 28 and having a diameter in cross section along the first side 26 and the second side 28, the shape of the hole 30 is not limited to any particular design, as long as the area and diameter of the hole 30 draws a sufficient amount of air there through to cool the seat cushion 22 as will be described below.

As shown in FIGS. 2-5, the vehicle seat 20 also includes an insert 34 including a top surface 38 and a bottom surface 40 and includes a plurality of channels 42 complementary in configuration to the plurality of recesses 32. Thus, in this embodiment, the plurality of channels 42 are formed in an H-shaped configuration to match the H-shaped configuration of the plurality of recesses 32. The insert 34 also includes an aperture 44 that is complementary in configuration to the hole 30. The insert 34 is positioned onto the first side 26 of the insert 34 such that the bottom surface 40 of the insert 34 abuts the first side 26 of the seat cushion 22 and such that the plurality of channels 42 are positioned within the plurality of recesses 32 and such that the aperture 44 is aligned with the hole 30.

As will be discussed further below, the width and depth of the plurality of channels 42, as well as the area of the aperture 44, should be sufficiently sized, even when the seat cushion 22 is compressed by an occupant, to allow sufficient air to flow from the channels 42 and through the aperture 44 and hole 30 to cool the first side 26 of the seat cushion 22.

While the embodiments shown in FIGS. 2-5 illustrate an impervious insert 34 having a pair of channels 42 extending from a aperture 44 generally along the length of first side 26 of the seat cushion 22 generally from a position closer to the back 25 of the seat cushion 22 to the front 27 of the seat cushion 22 in a H-shaped configuration, which correspond the positioning and number of recesses 32 and hole 30, it should be understood by a person of ordinary skill that the relative number channels 42 and/or apertures 44, corresponding to a similar number of recesses 32 and holes 30, may vary from the configuration shown. Moreover, in certain other embodiments, the relative positioning of the hole 30 may be closer to the front 27 or the back 25 of the seat cushion 22, or offset towards a left side 29 or right side 33 of the seat cushion 22, and still fall within the spirit of the present invention.

In certain embodiments, the insert 34 may be glued, sewed, or otherwise fastened to the first side 26 of the seat cushion 22.

Figure 5:
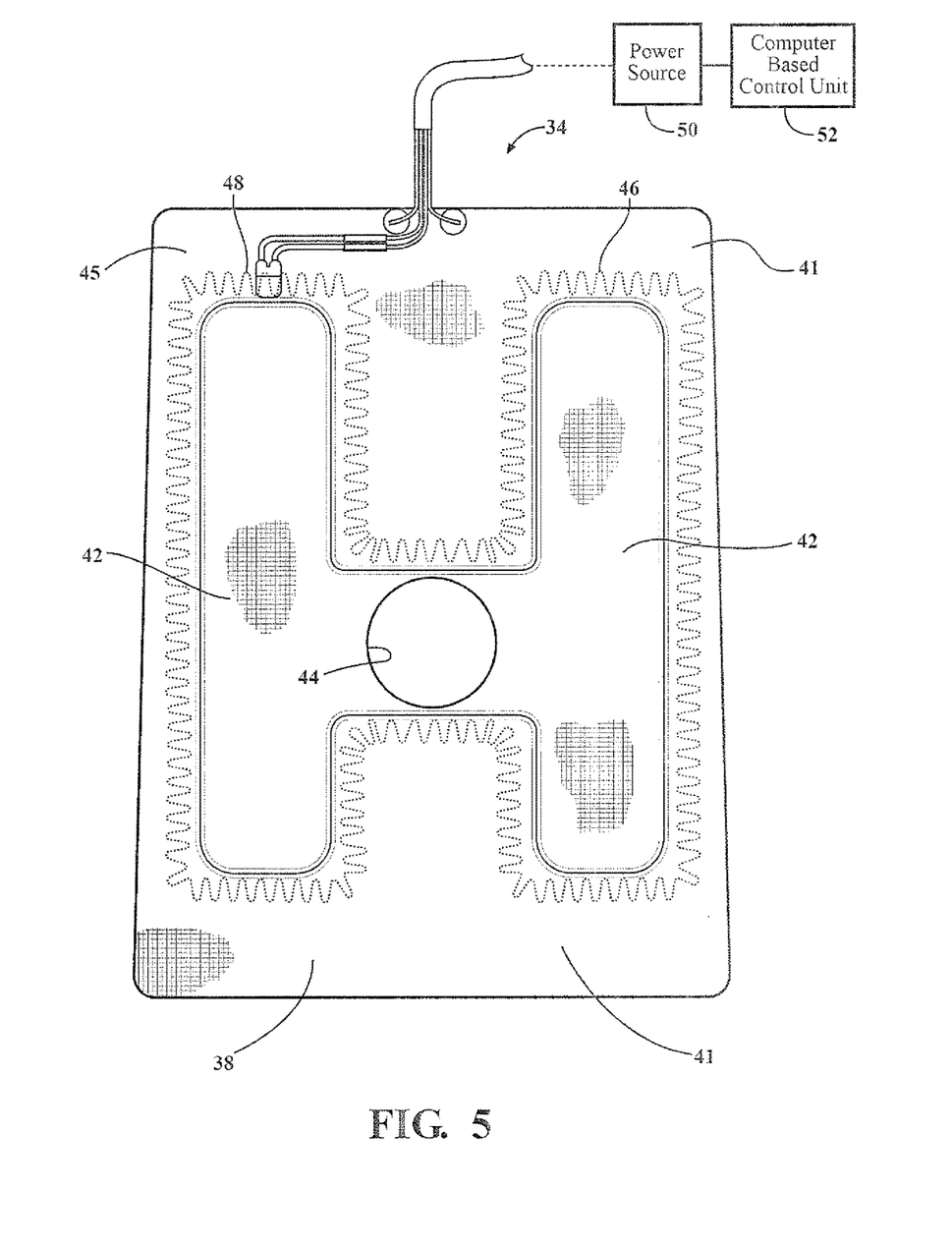
FIG. 5 is a front plan view of an impervious insert for a seat cushion according to one embodiment of the present invention.

The insert 34, as best shown in FIG. 5, is formed from a felt-like material 45, such as a polyester-based felt, and includes a heating element 46 that is used for heating the seat cushion 22. The felt-like material 45, in certain embodiments, is at least partially and preferably substantially impervious to air flow (i.e. it is an impervious insert 34). Hence, as noted in the previous paragraph, the air preferably flows across the channels 42, as opposed to flowing through the thickness of the insert 34, when the fan 62 is actuated to allow the first side 26 of the seat cushion 22 to be cooled. In certain embodiments, the felt-like material 45 is a polyester based felt having a thickness of about 3 millimeters.

In certain embodiments, the heating element 46 includes one or more electrically conductive resistance wires 48 positioned in a random pattern or in a grid pattern near the top surface 38 of the felt-like material 45 of the insert 34. In certain embodiments, such as shown in FIG. 5, the wires 48 are positioned along a main heating portion 41 of the insert 34 such that they do not extend within in the channels 42, while in other embodiments the wires 48 may be positioned in a grid-like or random pattern and extend with the channels 42.

The heating element 46, in certain embodiments and as shown in FIG. 3, is connected to a power supply unit 50 which delivers power to the heating element 46, or, in certain embodiments, to the one or more electrically conductive resistance wires 48. In certain embodiments, the power supply unit 50 may also include a computer-based control unit 52 that controls the power supplied from the power supply unit 50 to the heating element 46 or one or more electrically conductive resistance wires 48 to control the heating of the seat cushion 22.

In certain embodiments, as shown in FIG. 3, one or more temperature sensors 54 are disposed within a portion of the seat cushion 22, such as within the insert 34, for detecting the temperature of the seat cushion 22. In certain embodiments, the temperature sensors 54 are electrically coupled to the power supply unit 50. In certain other embodiments, the temperature sensors 54 may alternatively be electrically coupled to the computer-based control unit 52

As also seen in FIG. 2, a ventilation system 60 is coupled to the second side 28 of the seat cushion 22. The ventilation system 60 is configured to draw air from the first side 26 of the seat along the plurality of channels 42, through the aperture 44 and through the hole 30 to the second side 28 of the seat cushion 22.

The ventilation system 60 includes a fan 62 and a duct 64 that is positioned within a portion of the hole 30 near the second side 28 and includes one or more apertures 63.

Preferably, the size of the fan 62, in conjunction with the width, depth and number channels 42, as well as the cavity area within the hole 30 and size of the one or more internal apertures 63, are collectively configured to allow sufficient air to flow from the plurality of channels 42 through the aperture 44 and hole 30 and through internal apertures 63 to cool the first side 26 of the seat cushion 22 when the fan 62 is activated.

The ventilation system 60, in certain embodiments, is electrically coupled to the power supply unit 50. In certain other embodiments, the ventilation system 60 may alternatively be electrically coupled to the computer-based control unit 52.

Figure 7:
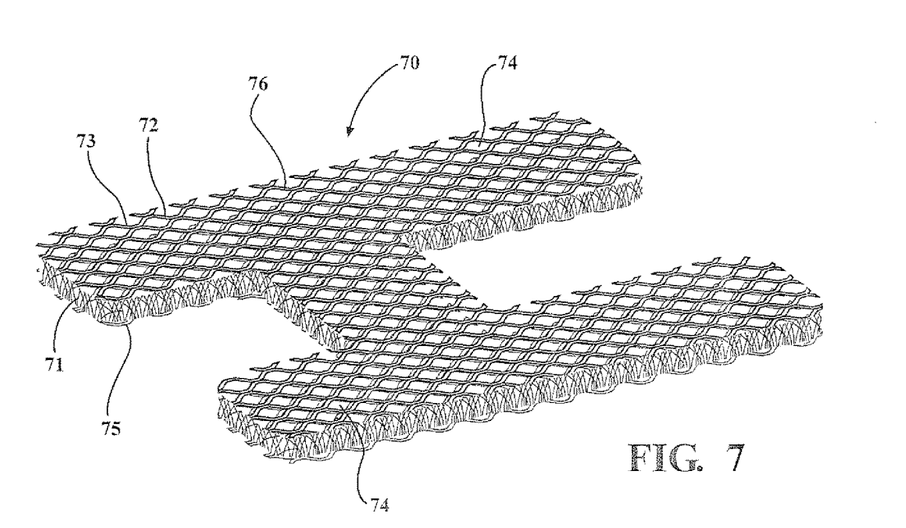
FIG. 7 is a perspective view of a honeycomb support structure for the seat cushion according to one embodiment of the present invention.

As best shown in FIGS. 2 and 7, a honeycomb support structure 70 having a shape complementary with the plurality of channels 42, here shown in the H-configuration, is disposed within the plurality of channels 42 and may optionally and preferably extend across the hole 30. The honeycomb support structure 70, as illustrated, is a three-dimensional mesh-like structure formed from one or more connected strands 72 of fiber or other flexible/ductile materials having a series of large voids 74 formed there between. The voids 74 are large enough in area to not significantly affect the flow of air through the plurality of channels 42 to the aperture 44 and hole 30 to efficiently to cool the first side 26 of the seat cushion 22.

The top surface 76 of the honeycomb support structure 70, in certain embodiments, is substantially coplanar with the corresponding first surface 26 of the seat cushion 22. Moreover, the strands 72 are oriented and otherwise connected configured such that the honeycomb support structure 70 provides a level of resiliency and strength to allow the honeycomb support structure 70 to compress in a similar manner to the portion of the seat cushion 22 including the insert 34 as an occupant is seated upon the seat cushion 22 and recover to its original shape after an occupant is unseated from the seat cushion 22. Moreover, in the compressed state (i.e. when the seat cushion 22 is occupied), the depth and width of the channels 42 are substantially maintained to allow to allow sufficient air to be drawn through the plurality of channels 42 and into the inner aperture 44 and hole 30 to cool the seat cushion 22.

As best shown in FIG. 7, in certain embodiments, the strands 72 include a spacer pile yarn 71 interconnected between a top mesh material 73 and a bottom mesh material 75 to form the three-dimensional structure that define the plurality of voids 74 there between. One exemplary honeycomb support structure 70 utilizing the pile yarn 71 and mesh material 73, 75 is 3 mesh Spacer Fabric, manufactured and sold by Müller Textiles of Wiehl, Germany and Del Rio, Tex.

Referring back to FIG. 3, the seat cushion 22 also includes a covering 80 made of an appropriate covering material, such as cloth, upholstery, leather or vinyl, that is disposed over the impervious insert 34 and honeycomb support structure 70. The seat cushion 22 is usually supported on a metallic or plastic frame (not shown) and may include springs (not shown) positioned between the frame and seat cushion 22.

Figure 1:
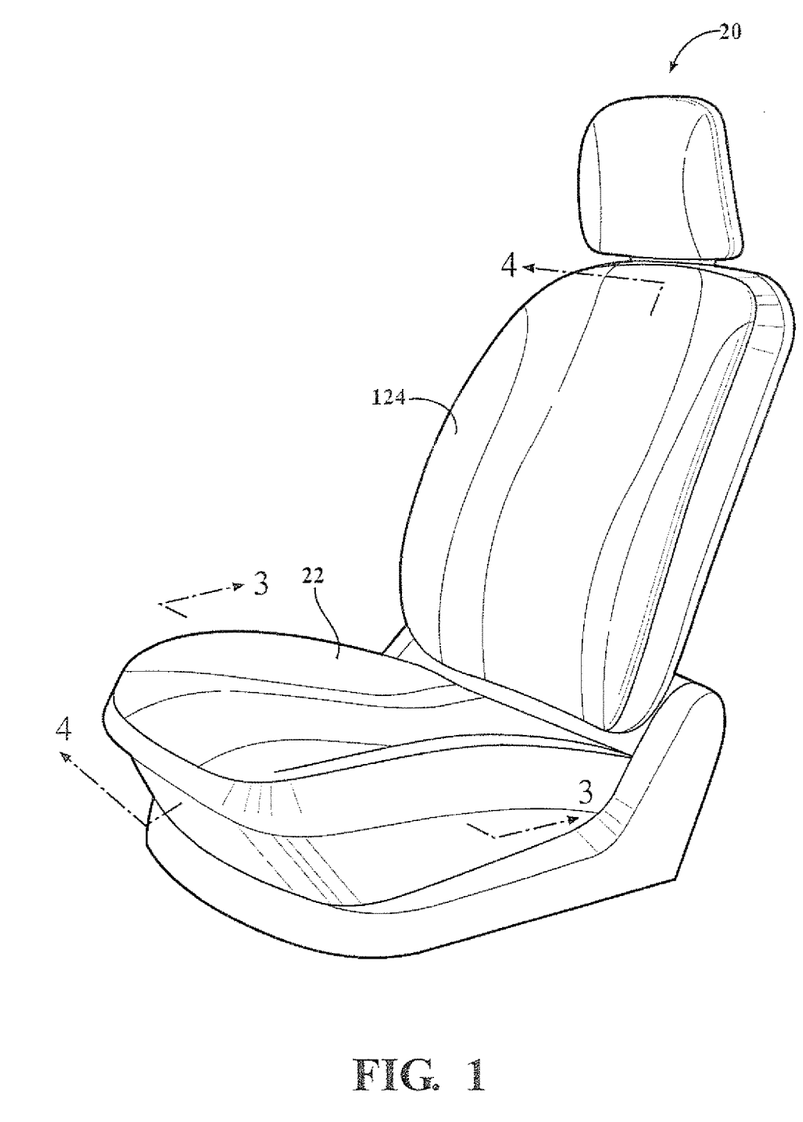
FIG. 1 is a perspective view of a vehicle seat according to one embodiment of the present invention.

In certain embodiments, such as also shown in FIGS. 1, 2, and 4, the seat back 124 is configured with a heating and cooling system that is substantially similar in design to that of the seat cushion 22.

Thus, referring back to FIGS. 2 and 4, in certain embodiments, the seat back 124 also includes a hole 130 that extends from the first side 126 to the second side 128. A plurality of recesses 132 extend from the hole 130 along the first side 126. The plurality of recesses 132 may be configured similar to the recesses 32 of the seat cushion 22 or in an alternative configuration. Thus, as shown herein, the recesses 132 may generally form a U-shaped configuration. Similar to hole 30, the shape of the hole 130 is not limited to any particular design and may be different in shape than the hole 30, as long as the area of the draws a sufficient amount of air there through as will be described below. As shown herein, the hole 130 is illustrated as being squared shaped in cross section, as opposed to the round cross-sectional shape for hole 60 illustrated for the seat cushion 22 as described above.

Figure 6:
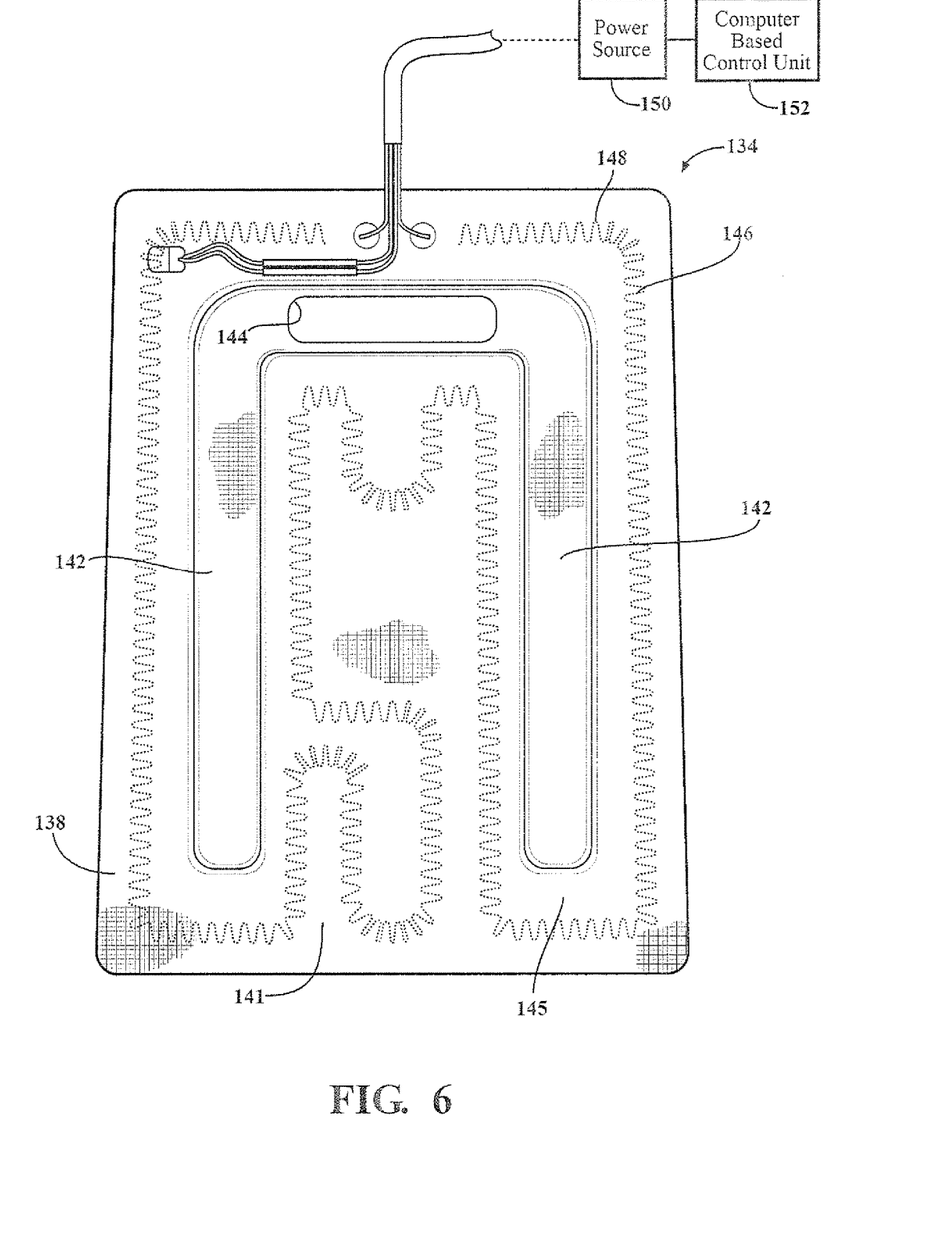
FIG. 6 is a front plan view of an impervious insert for a seat back according to one embodiment of the present invention.

As best shown in FIGS. 2, 4 and 6, the vehicle seat 20 also includes an impervious insert 134 including a top surface 138 and a bottom surface 140 and includes a plurality of channels 142 complementary in configuration to the plurality of recesses 132. The insert 134 also includes an aperture 144 that is complementary in configuration to the hole 130. The insert 134 is positioned onto the first side 126 of the insert 134 such that the bottom surface 140 of the insert 134 abuts the first side 126 of the seat back 124 and such that the plurality of channels 142 are positioned within the plurality of recesses and such that the aperture 144 is aligned with the hole 130.

While the embodiments shown in FIGS. 2 and 4 illustrate an impervious insert 134 having a pair of channels 142 extending from a aperture 144 generally along the length of first side 126 of the seat back 24 generally from a position closer to the bottom 125 of the seat back 124 to the top 127 of the seat back 124 in a U-shaped configuration, which correspond the positioning and number of recesses 132 and hole 130, it should be understood by a person of ordinary skill that the relative number channels 142 and/or apertures 144, corresponding to a similar number of recesses 132 and holes 130, may vary from the configuration shown. Moreover, in certain other embodiments, the relative positioning of the hole 130 may be closer to the top 127 of the seat back 124, or offset towards a left side 129 or right side 133 of the seat back 124, and still fall within the spirit of the present invention.

The insert 134, in certain embodiments as best shown in FIG. 6, is formed from a felt-like material 145, such as a polyester-based felt, and includes a heating element 146 that is used for heating the seat back 124. The felt-like material, in certain embodiments, is at least partially and preferably substantially impervious to air flow (i.e. it is an impervious insert 134). Hence, as noted in the previous paragraph, the air preferably flows across the channels 142, as opposed to flowing through the thickness of the insert 134, to allow the first side 126 of the seat back 124 to be cooled.

In certain embodiments, the felt-like material 145 is a polyester based felt having a thickness of about 3 millimeters.

In certain embodiments, the heating element 146 includes one or more electrically conductive resistance wires 148 positioned in a random pattern or in a grid pattern near the top surface 138 of the felt-like material 145 of the insert 134. In certain embodiments, such as shown in FIG. 6, the wires 148 are positioned within the main heating portion 141 of the insert 134 such that they do not extend within in the channels 142, while in other embodiments the wires 148 may be positioned in a grid-like or random pattern and extend with the channels 142.

The heating element 146, in certain embodiments, is connected to a power supply unit 150 which delivers power to the heating element 146, or, in certain embodiments, to the one or more electrically conductive resistance wires 148. In certain embodiments, the power supply unit 150 may also include a computer-based control unit 152 that controls the power supplied from the power supply unit 150 to the heating element 146 or one or more electrically conductive resistance wires 148 to control the heating of the seat cushion 122.

In alternative embodiments (not shown), the heating element 146 may be connected to the power supply unit 50.

In certain embodiments, such as shown in FIG. 4, one or more temperature sensors 154 are disposed within a portion of the seat back 124, such as within the insert 134, for detecting the temperature of the seat back 124. In certain embodiments, the temperature sensors 154 are electrically coupled to the power supply unit 150. In certain other embodiments, the temperature sensors 154 may alternatively be electrically coupled to the computer-based control unit 152. As above, in certain other embodiments (not shown), the heating element 146 may be connected to the power supply unit 50.

As also seen in FIG. 2, a ventilation system 160 is coupled to the second side 128 of the seat back 124.

The ventilation system 160 includes a fan 162, duct 164, and, in certain embodiments, a first fastener 143 and second fastener 185.

As best shown in FIGS. 2 and 4, the first fastener 143 includes an outer lip 147 and an inner portion 149 that positions and secures the insert 134 to first side 126 of the seat back 124. The outer surface 151 of the inner portion 149 is sized to be complimentary and adjacent to the inner surface 131 of the hole 130 and extends at least partially towards the second side 128 of the seat back 124 through the aperture 144 and within the hole 130. The first fastener 143 includes an internal aperture 153 that extends from the first surface 155 of the first fastener 143 through the inner portion 149 to the second surface 157. Thus, when the first fastener 143 is secured, the inner surface 159 of the outer lip 147 is positioned adjacent to the first side 126 of the seat back 124.

In certain embodiments, a second fastener 185 having an outer portion 187 and an inner portion 189 is also utilized. The outer surface 191 of the inner portion 189 is sized to be complimentary and adjacent to the inner surface 131 of the hole 130 and extends at least partially towards the second side 128 of the seat back 124. The second fastener 185 includes an internal aperture 193 that extends from the first surface 195 of the second fastener 185 through the inner portion 189 to the second surface 197. Thus, when the first fastener 143 and second fastener 185 are positioned along the seat back 124, the first surface 195 of the second fastener 185 is adjacent or near to the corresponding second surface 157 of the first fastener 143 such that the internal aperture 193 of the first fastener 143 is aligned with the internal aperture 193 of the second fastener 185.

The duct 164 includes an internal aperture 163 and is positioned between the fan 162 and the second fastener 185. In certain embodiments, the second surface 197 of the second fastener 185 is positionally located adjacent or near to the duct 164 such that the internal aperture 193 is aligned with the internal aperture 163 of the duct 164.

In other embodiments, wherein the first fastener 143 and second fastener 185 are not utilized, the duct 164 may be positioned such that the internal aperture 163 is aligned directly with the hole 130 of the seat back 124. In these embodiments, the insert 134 may be glued, sewed, or otherwise fastened to the first side 126 of the seat back 124.

Preferably, the size of the fan 162, in conjunction with the width and depth of the plurality of channels 142, as well as the cavity area within the internal apertures 153, 193, 163, are collectively configured to allow sufficient air to flow from the plurality of channels 142 and through internal apertures 153, 193, 163 to cool the first side 126 of the seat back 124 when the seat 20 is occupied by an occupant and when the fan 162 is activated.

Alternatively, in embodiments not utilizing the first fastener 143 and second fastener 185, the size of the fan 162, in conjunction with the width w and depth d of the plurality of channels 142, as well as the cavity area aperture 144 and hole 130, are collectively configured to allow sufficient air to flow from the plurality of channels 142 and through aperture 144, hole 130 and internal aperture 163 to cool the first side 126 of the seat back 124 when the seat 20 is occupied by an occupant and when the fan 162 is activated The ventilation system 160, in certain embodiments, is electrically coupled to the power supply unit 150. In certain other embodiments, the ventilation system 160 may alternatively be electrically coupled to the computer-based control unit 152. In still other embodiments, the ventilation system 160 is coupled to the power supply unit 50 and/or computer-based control unit 52.

Figure 8:
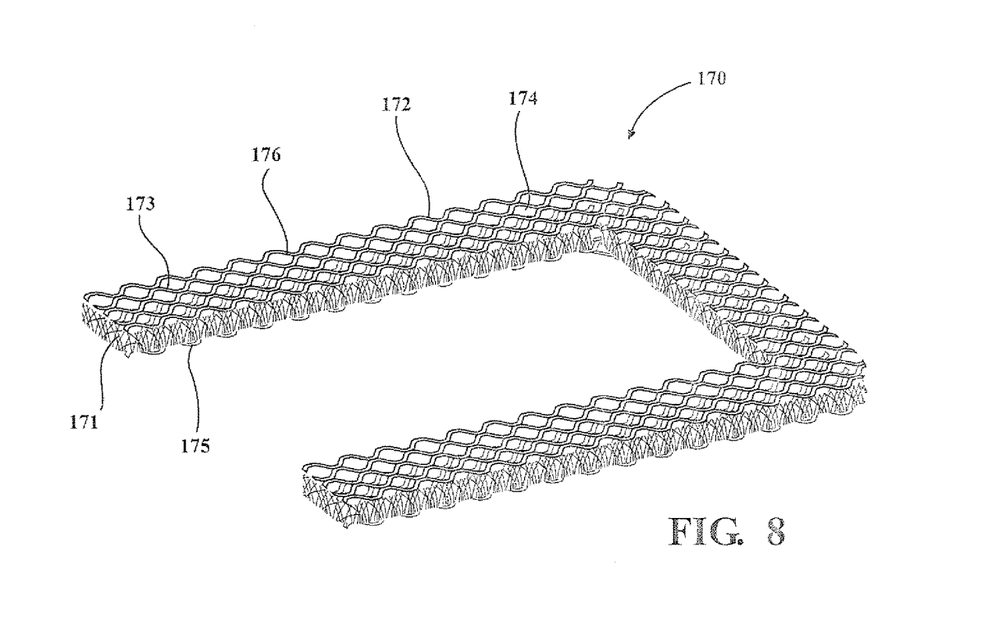
FIG. 8 is a perspective view of a honeycomb support structure for the seat back according to one embodiment of the present invention.

As best shown in FIGS. 2 and 8, a honeycomb support structure 170 having a shape complementary with the plurality of channels 142, here shown in a U-shaped configuration is disposed within the plurality of channels 142 and may optionally and preferably be disposed over the hole 30 and first fastener 143. The honeycomb support structure 170, as illustrated, is a three-dimensional mesh-like structure formed from one or more connected strands 172 of fiber or other flexible/ductile materials having a series of large voids 174 formed there between. The voids 174 are large enough in area to not significantly affect the flow of air through the plurality of channels 142 to the aperture 144 and hole 130 to efficiently to cool the first side 126 of the seat back 124.

The front surface 176 of the honeycomb support structure 170, in certain embodiments, is substantially coplanar with the corresponding first surface 126 of the seat back 124. Moreover, the strands 172 are oriented and otherwise connected configured such that the honeycomb support structure 170 provides a level of resiliency and strength to allow the honeycomb support structure 170 to compress in a similar manner to the portion of the seat back 124 including the insert 134 as an occupant is seated in the seat 20 and compresses against the front surface 126. The honeycomb support structure 170 is also configured to recover to its original shape after an occupant is unseated from the seat 20. Moreover, in the compressed state (i.e. when the seat 20 is occupied and the occupant presses against the seat back 124), the depth and width of the channels 142 are maintained to allow to allow sufficient air to be drawn through the plurality of channels 142 and through the ventilation system 160 to cool the first side 126 of the seat back 124.

In certain embodiments, the honeycomb support structure 170 is formed from the same material as the honeycomb support structure 70 of FIG. 7. Thus, as shown in FIG. 8, the strands 172 include a spacer pile yarn 171 interconnected between a top mesh material 173 and a bottom mesh material 175 to form the three-dimensional structure that define the plurality of voids 174 there between.

As best shown in FIG. 4, the seat back 124 also includes a covering 180 made of an appropriate covering material, such as cloth, upholstery, leather or vinyl, that is disposed over the impervious insert 134 and honeycomb support structure 170. The seat back 124 is usually supported on a metallic or plastic frame (not shown) and may include springs (not shown) positioned between the frame and seat back 124.

In certain embodiments, the power supply unit 50, 150 including in certain embodiments the computer-based control unit 52, 152 are electrically coupled to a manual switch or switches located within a passenger compartment of a vehicle, such as within the electronic display on the vehicle's dashboard. Thus, an occupant of the vehicle can activate the manual switch or switches to send an electronic signal to the computer based control unit 52, 152 which in turn directs the power source 50, 150 to activate the heating element 46 and/or 146 to heat the seat cushion 22 and/or seat back 124 as desired. Similarly, the occupant of the vehicle can activate the manual switch or switches to send an electronic signal to the computer based control unit 52, 152 which in turn directs the power source 50, 150 to activate the ventilation system 60 and/or 160, and in turn activate the respective fans 62 and/or 162, to cool the seat cushion 22 or seat back 124 as desired.

In addition to manual control, in certain embodiments that include the computer-based control unit 52 and/or 152 and temperature sensors 54, 154, the heating and cooling system may also be controlled electronically.

Thus, for example, in certain embodiments, the manual switch or switches on the dashboard may be activated wherein they are preset to a desired temperature. The temperature sensors 54 and/or 154 send a signal to the computer-based control unit 52 and/or 152 indicating the measured temperature of the seat cushion 22 and/or seat back 124.

If the temperature of either the seat cushion 22 and/or seat back 124 is above the manual set desired temperature, the control unit 52, 152 will send an electronic signal to the power source 50, 150 to electronically activate the respective fan 62, 162 to draw air through the respective channels 42, 142 until such time as the desired temperature is measured by the respective temperature sensors 54, 154, at which time the control unit 52, 152 sends an electronic signal to the power source 50, 150 to turn off the respective fan or fans 62, 162.

If the temperature of either the seat cushion 22 and/or seat back 124 is below the manual set desired temperature, the control unit 52, 152 will send an electronic signal to the power source 50, 150 to activate the respective heating element 46, 146 and/or to activate the respective one or more electrically conductive resistance wires 48, 148 to heat the seat cushion 22 and/or seat back 124 until such time as the desired temperature is measured by the respective temperature sensors 54, 154, at which time the control unit 52, 152 sends an electronic signal to the power source 50, 150 to deactivate the respective one of the heating elements 46, 146 and/or more electrically conductive resistance wires 48, 148.

Thus, the vehicle seat 20 in accordance with the present invention allows the vehicle occupant to precisely control the temperature of the vehicle seat 20 in a variety of driving conditions.

As noted above, while the invention described in FIGS. 1-8 illustrates the use of a heating and cooling system as described in both the seat cushion 22 and seat back 124, in certain other embodiments (not shown), the heating and cooling system may be utilized in only the seat cushion 22, or in only the seat back 124, and still fall within the scope of the present invention.

In the embodiments shown above that include two ventilation systems 60, 160, it is illustrated that each ventilation system 60, 160 and/or heating element 46, 146 is connected to a respective power supply unit 50, 150 and/or to a respective control unit 52, 152. However, it is within the scope of the present invention that a single power supply unit that may include a single control unit may be electrically coupled to both ventilation systems 60, 160 and/or to both heating element 46, 146. Thus, the single, integrated power supply unit and control unit may be used to control the temperature of both the seat cushion 22 and seat back 124.

The invention has been described in an illustrative manner, and it is to be understood that the terminology, which has been used, is intended to be in the nature of words of description rather than of limitation. It is now apparent to those skilled in the art that many modifications and variations of the present invention are possible in light of the above teachings. It is, therefore, to be understood that the invention can be practiced otherwise than as specifically described.

What is claimed is:

1. A vehicle seat assembly comprising;
   a seat cushion having a first side and a second side,
   a seat back coupled to said seat cushion with said seat back having a first side and a second side,
   at least one of said seat cushion and said seat back defining a hole extending from said respective first side to said second side and said at least one of said seat cushion and said seat back defining a plurality of recesses extending from said hole along said first side,
   an impervious insert comprising a heating element positioned on said first side of said at least one of said seat cushion and said seat back with said insert defining an aperture aligning with said hole and a plurality of channels complementary in configuration with said plurality of recesses and aligning with said plurality of recesses, and
   a ventilation system coupled to said second side of said at least one of said seat cushion and said seat back about said hole for drawing air along said plurality of channels through said aperture and said hole to said second side.

2. The vehicle seat assembly according to claim 1 further comprising a cover disposed over said at least one of said seat cushion and said seat back such that said insert is located between said cover and said at least one of said seat cushion and said seat back.

3. The vehicle seat assembly according to claim 1 wherein said ventilation system comprises a fan and a duct coupled between said fan and said second side of said at least one of said seat cushion and said seat back.

4. The vehicle seat assembly according to claim 1, wherein said impervious insert is formed of a felt material and includes a main heating portion with one or more electrically conductive wires positioned within said main heating portion.

5. The vehicle seat assembly according to claim 4 wherein said one or more electrically conductive wires are electrically coupled to a computer-based control unit.

6. The vehicle seat assembly according to claim 1 further comprising a temperature sensor coupled to at least one of said seat cushion and said seat back for measuring a temperature of said at least one of said seat cushion and said seat back.

7. The vehicle seat assembly according to claim 6 further comprising a computer-based control unit electrically coupled to said ventilation system and to said temperature sensor for controlling the operation of said ventilation system.

8. The vehicle seat assembly according to claim 7 wherein said computer-based control unit is also electrically coupled to said heating element for controlling the operation of said heating element.

9. The vehicle seat assembly according to claim 1 further comprising a support structure disposed within said plurality of channels with said support structure defining an exterior surface that is substantially aligned with said first side of said at least one of said seat cushion and said seat back.

10. The vehicle seat assembly according to claim 9 wherein said support structure has a honeycomb configuration.

11. The vehicle seat assembly according to claim 9 wherein said support structure comprises a plurality of strands interconnected in a three dimensional structure and defining a plurality of voids.

12. The vehicle seat assembly according to claim 9 further comprising a cover disposed over said at least one of said seat cushion and said seat back such that said insert and said support structure are disposed between said cover and said at least one of said seat cushion and said seat back.

13. A vehicle seat assembly comprising:
   a seat cushion having a first side and a second side and defining a hole extending from said first side to said second side, with said seat cushion further defining a plurality of recesses extending from said hole along said first side,
   a seat back coupled to said seat cushion with said seat back having a first side and a second side and defining a hole extending from said first side to said second side of said seat back with said seat back further defining a plurality of recesses extending from said hole of said seat back along said first side of said seat back,
   a first impervious insert comprising a first heating element positioned on said first side of said seat cushion with said first insert defining a first aperture aligning with said hole of said seat cushion and a plurality of first channels complementary in configuration with said recesses of said seat cushion and aligning with said recesses of said seal cushion,
   a second impervious insert comprising a second heating element positioned on said first side of said seat back with said second impervious insert defining a second aperture aligning with said hole of said seat back and a plurality of second channels of said seat back complementary in configuration with said recesses of said seat back and aligning with said recesses of said seat back,
   a first ventilation system coupled to said second side of said seat cushion about said hole of said seat cushion for drawing air along said plurality of first channels of said seat cushion through said first aperture and said hole of said seat cushion to said second side of said seat cushion, and
   a second ventilation system coupled to said second side of said seat back about said hole of said seat back for drawing air along said plurality of second channels of said seat back through said second aperture and said hole of said seat back to said second side of said seat back.

14. The vehicle seat assembly according to claim 13 further comprising:
   a first cover disposed over said seat cushion such that said first impervious insert is located between said first cover and said seat cushion, and a second cover disposed over said seat back such that said second impervious insert is located between said second cover and said seat back.

15. The vehicle seat assembly according to claim 13 further comprising:
a temperature sensor coupled to at least one of said seat cushion and said seat back for measuring the temperature of said at least one of said seat cushion and said seat back; and
a computer-based control unit electrically coupled to said first and second ventilation systems, to said temperature sensor, and to said first and second heating elements for controlling the actuation of said first and said second ventilation systems and for controlling the actuation of said first and second heating elements.

16. The vehicle seat assembly according to claim 13 wherein said first ventilation system comprises a first fan and a first duct coupled between said first fan and said second side of said seat cushion; and
wherein said second ventilation system comprises:
a first fastener for securing said second impervious insert to said first side of said seat back, said first fastener including an inner portion positioned within said hole, said inner portion including an internal aperture extending from a first surface to a second surface of said first fastener;
a second fastener coupled to a second side of said seat back, said second fastener including an inner portion and an outer portion positioned within said second hole of said seat back and including an internal aperture extending from a first surface to a second surface of said first fastener such that said internal aperture is aligned with said internal aperture of said first fastener;
a second duct coupled to said outer portion of said second fastener, said second duct including an internal aperture that is aligned with said internal aperture of said second fastener; and
a second fan coupled to said second duct, wherein the activation of said second fan draws air along said plurality of channels of said second impervious insert and through said internal aperture of said first fastener and said second fastener and said second duct to said second side of said seat back.

17. The vehicle seat assembly according to claim 13 further comprising:
a first support structure disposed within said plurality of first channels, with said first support structure defining an exterior surface that is substantially aligned with said first side of said seat cushion, and
a second support structure disposed within said plurality of second channels, with said second support structure defining an exterior surface that is substantially aligned with said first side of said seat back.

18. The vehicle seat assembly according to claim 17 wherein said first support structure and said second support structure each separately comprise a plurality of strands interconnected in a three dimensional structure and defining a plurality of voids.

19. The vehicle seat assembly according to claim 13, wherein said first impervious insert is formed of a felt material and includes a first main heating portion with one or more first electrically conductive wires positioned within said first main heating portion; and
wherein said second impervious insert is formed of a felt material and includes a second main heating portion with one or more second electrically conductive wires positioned within said second main heating portion.

20. The vehicle seat assembly according to claim 19, wherein said first electrically conductive wires of said first impervious insert and said second electrically conductive wires of said second impervious insert are electrically coupled to a computer-based control unit.

* * * * *